(12) United States Patent
Ichihashi et al.

(10) Patent No.: US 7,623,281 B2
(45) Date of Patent: Nov. 24, 2009

(54) SCANNING OPTICAL SYSTEM, IMAGE FORMATION APPARATUS INCLUDING THE SCANNING OPTICAL SYSTEM, AND IMAGING OPTICAL SYSTEM USED IN THE SCANNING OPTICAL SYSTEM

(75) Inventors: Kouki Ichihashi, Osaka (JP);
Daizaburo Matsuki, Osaka (JP)

(73) Assignee: Panasonic Corporation, Osaka (JP)

( * ) Notice: Subject to any disclaimer, the term of this patent is extended or adjusted under 35 U.S.C. 154(b) by 278 days.

(21) Appl. No.: 11/783,646

(22) Filed: Apr. 11, 2007

(65) Prior Publication Data

US 2007/0285755 A1    Dec. 13, 2007

(30) Foreign Application Priority Data

Jun. 7, 2006    (JP) .............................. 2006-158309

(51) Int. Cl.
*G02B 26/08* (2006.01)
(52) U.S. Cl. .................................................. 359/205.1
(58) Field of Classification Search .......... 359/205–208
See application file for complete search history.

(56) References Cited

U.S. PATENT DOCUMENTS 6,215,574 B1    4/2001   Toyoda 6,392,773 B1 *  5/2002   Hama et al. .............. 359/204.1

FOREIGN PATENT DOCUMENTS

| JP | 2000-2847 | 1/2000 |
|---|---|---|
| JP | 2000-180781 | 6/2000 |
| JP | 3420956 | 4/2003 |
| JP | 2005-37561 | 2/2005 |

* cited by examiner

*Primary Examiner*—Euncha P Cherry
(74) *Attorney, Agent, or Firm*—McDermott Will & Emery LLP

(57) ABSTRACT

A scanning optical system includes a deflector for deflecting a laser light flux from a light source and a second imaging optical system for focusing the laser light flux deflected by the deflector on a target scanning surface. The second imaging optical system has at least one optical function surface on which an optical function portion including a plurality of convex portions arranged therein so as to have a serrate cross section is formed in at least part thereof. The optical function surface is formed so that a width of each of the convex portions in an arrangement direction in which the convex portions are arranged is larger than a width of the laser light flux in the arrangement direction, which enters the optical function surface.

17 Claims, 12 Drawing Sheets

SCANNING OPTICAL SYSTEM, IMAGE FORMATION APPARATUS INCLUDING THE SCANNING OPTICAL SYSTEM, AND IMAGING OPTICAL SYSTEM USED IN THE SCANNING OPTICAL SYSTEM

BACKGROUND OF THE INVENTION

1. Field of the Invention

The present invention relates to a scanning optical system, an image formation apparatus including the scanning optical system and an imaging optical system used in the scanning optical system.

2. Description of Prior Art

In general, an image formation apparatus such as a laser beam printer includes a semiconductor laser as a light source, a polygon mirror as an optical deflector for deflecting laser light flux, and a scanning lens (imaging optical system) for forming an image of a laser light flux deflected by the polygon mirror. As described in Japanese Patent No. 3420956, in a known technique, a refractive lens has been used as a scanning lens. In recent years, however, in view of realizing high dimensional aberration correction and the like, use of a scanning lens having a diffractive surface has been proposed (see, for example, Japanese Laid-Open Publication Nos. 12-2847 and 2005-37561).

SUMMARY OF THE INVENTION

However, a diffractive surface has a very high sensitivity and, therefore, when a scanning lens having a diffractive surface is used, the scanning lens is easily influenced by disturbances. For example, optical characteristics of a diffractive surface might be degraded due to increase in temperature and vibration of an image formation apparatus. Moreover, the diffractive surface has very large dispersion, compared to a refractive surface, so that large chromatic aberration occurs in the diffractive surface.

In view of the above-described problems, the present invention has been devised. It is therefore an object of the present invention to provide a scanning optical system having high optical performance and being highly resistant to disturbance.

To achieve the object, a scanning optical system according to the present invention is characterized in that the scanning optical system includes: a deflector for deflecting a light flux from a light source; and an imaging optical system for focusing the light flux deflected by the deflector on a target scanning surface, and the imaging optical system has at least one optical function surface on which an optical function portion including a plurality of convex portions arranged therein so as to have a serrate cross section is formed in at least part thereof and the one optical function surface is formed so that a width of each of the convex portions in an arrangement direction in which the convex portions are arranged is substantially equal to or larger than a width of the light flux in the arrangement direction, which enters the optical function surface.

An image formation system according to the present invention is characterized by including the scanning optical system of the present invention.

An imaging optical system according to the present invention is characterized in that the imaging optical system focuses, in a scanning optical system for deflecting a light flux from a light source and scanning a target scanning surface, the light flux on the target scanning surface, and the imaging optical system has at least one optical function surface on which an optical function portion including a plurality of convex portions arranged therein so as to have a serrate cross section is formed in at least part thereof and the one optical function surface is formed so that a width of each of the convex portions in an arrangement direction in which the convex portions are arranged is substantially equal to or larger than a width of the light flux in the arrangement direction, which enters the optical function surface.

In this specification, "a width of each of convex portions in an arrangement direction in which the convex portions are arranged is substantially equal to a width of a light flux in the arrangement direction, which enters an optical function surface" explains the relationship between a width of each of the convex portions in the arrangement direction and a width of the light flux in the arrangement direction which enters the optical function surface, with which a dispersion characteristic of the optical function surface becomes closer to a dispersion characteristic of refraction light. Specifically, it means that the width of each of the convex portions in the arrangement direction is larger than ⅔ of the width of the light flux which enters the optical function surface, in the arrangement direction. In other words, the width of the light flux which enters the optical function surface, in the arrangement direction is less than 1.5 times as large as the width of each of the convex portions in the arrangement direction.

According to the present invention, a scanning optical system having high optical performance and being highly resistant to turbulences can be achieved.

BRIEF DESCRIPTION OF THE DRAWINGS

FIG. 2 is a cross-sectional view illustrating enlarged part of a deflector side surface 33a.

DESCRIPTION OF THE PREFERRED EMBODIMENTS

After vigorous studies, the present inventors have reached the following finding. In an optical function surface on which an optical function portion including a plurality of convex portions arranged therein so as to have a serrate cross section is formed, when a width of each of the convex portions in an arrangement direction in which the convex portions are arranged is smaller than a width of a laser light flux in the arrangement direction, which enters the optical function surface, and particularly when the width of the laser light flux is equal to or larger than the double of the width of each of the convex portions, a diffraction light flux is generated by entering of the laser light flux. On the other hand, when the width of each of the convex portions in the arrangement direction in which the convex portions are arranged is substantially equal to or larger than the width of the laser light flux in the arrangement direction, which enters the optical function surface, the generation of a diffraction light flux is suppressed and the generation of refraction light is dominant. This was actually found for the first time by the present inventors. Then, the present inventors reached to the present invention.

Hereafter, embodiments of the present invention will be described in detail with reference to the accompanying drawings.

Figure 1:
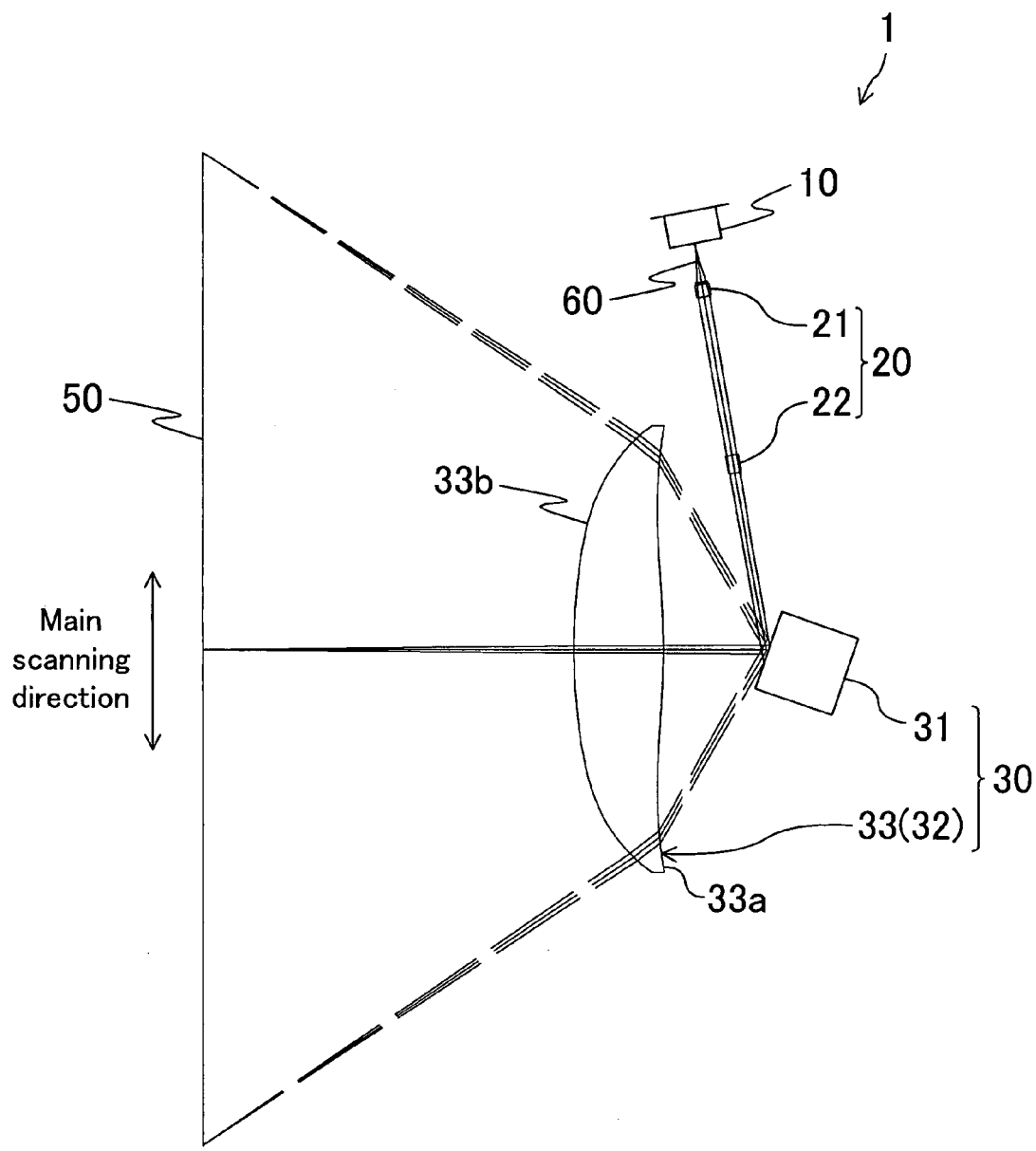
FIG. 1 is a cross-sectional view illustrating a structure of main part of an optical scanning apparatus 1 in a main scanning direction.
Figure 2:
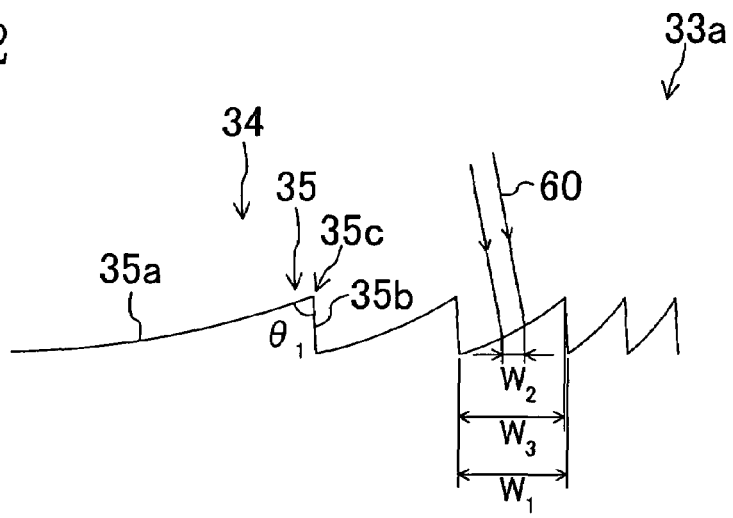
Figure 3:
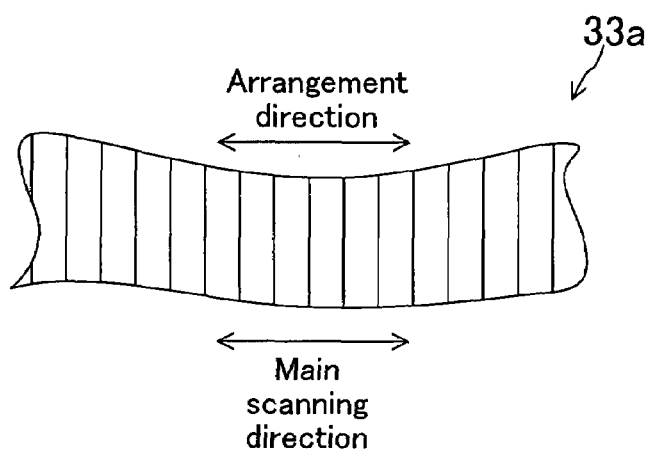
FIG. 3 is a plan view illustrating enlarged part of the deflector-closer-side surface 33a of the scanning lens 33.

FIG. 1 is a cross-sectional view illustrating a structure of main part of an optical scanning apparatus 1 according to this embodiment of the present invention in a main scanning direction. FIG. 2 is a cross-sectional view illustrating enlarged part of an optical function surface 33a. FIG. 3 is a plan view illustrating enlarged part of a deflector-closer-side surface, i.e., the optical function surface 33a.

The optical scanning apparatus 1 of this embodiment includes a light source 10, a first imaging optical system 20 and a scanning optical system 30 for deflecting a laser light flux 60 from the light source 10 and scanning a target scanning surface 50. The scanning optical system 30 includes a deflector (for example, a polygon mirror or the like) 31 with a plurality of deflective surfaces and for deflecting the laser light flux 60 from the light source 10 and a second imaging optical system 32.

The light source 10 outputs the laser light flux 60. For example, the light source 10 can be formed of a semiconductor laser device or the like.

The first imaging optical system 20 forms an image of the laser light flux 60 from the light source 10 on a deflective surface of the deflector 31. A structure of the first imaging optical system 20 is not particularly limited but, for example, as shown in FIG. 1, the first imaging optical system 20 can be formed of a collimator lens 21 and a cylindrical lens 22. In this embodiment, the collimator lens 21 converts the laser light flux 60 output from the light source 10 to an approximately parallel light flux. The cylindrical lens 22 does not have optical power in the main scanning direction but has optical power only in a sub-scanning direction which is perpendicular to the main scanning direction. The cylindrical lens 22 outputs the laser light flux 60 which has been converted to an approximately parallel light flux by the collimator lens 21 as it is in a main scanning cross section. On the other hand, the cylindrical lens 22 converges the laser light flux 60 and forms a linear image on a deflective surface (deflective reflection surface) of the deflector 31 in a sub-scanning cross section.

The second imaging optical system 32 forms an image of the laser light flux 60 deflected by the deflector 31 on the target scanning surface 50. In this embodiment, the second imaging optical system 32 includes the optical function surface 33a and does not have a diffractive surface. As shown in FIG. 2, the optical function portion 34 including the plurality of convex portions 35 arranged therein so as to have a serrate cross section is formed on at least part of the optical function surface 33a. In this embodiment, specifically, the optical function portion 34 is formed over an entire region of the optical function surface 33a which the laser light flux 60 enters.

Figure 4:
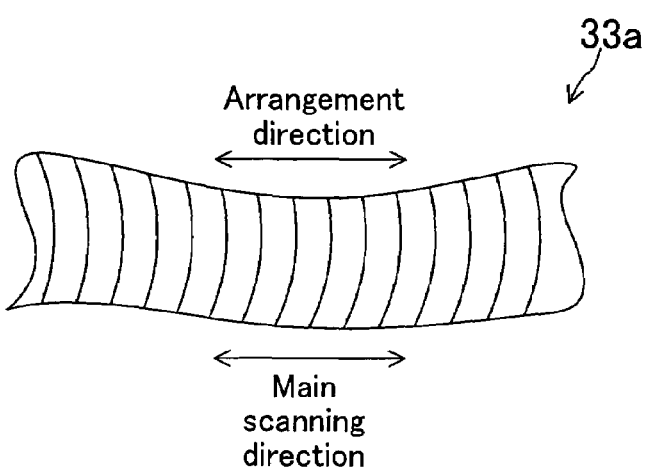
FIG. 4 is a plan view illustrating enlarged part of an optical function surface 33a in a modified example.

The optical function portion 34 has a shape obtained by adding an optical path difference function for generating a desired optical path difference to a spherical surface, an aspherical surface or a free-form surface as a base. More specifically, in this embodiment, each of the convex portions 35 is a filiform convex portion including a first side surface 35a and a second side surface 35b each of which has a long strip-like shape so as to have an approximately triangular cross section. The first side surface 35a corresponds to the optical path difference function. The convex portions 35 are arranged along the approximately parallel direction to the main scanning direction. In this embodiment, as shown in FIG. 3, each of the convex portions 35 extends straight in the sub-scanning direction. However, for example, as shown in FIG. 4, the plurality of convex portions 35 may be formed so that the convex portions are placed in an orbicular zone and also each of the convex portions 35 is curved.

Herein, an "approximately triangular shape" includes a triangular shape having each top portion chamfered or R-chamfered and a triangular shape having one or two curved sides. An angle of each top portion may be 90 degrees or more, or 90 degrees or less.

In this case, the optical function surface 33a is formed so that a width $W_1$ of each of the convex portions 35 in an arrangement direction in which the convex portions 35 are arranged is larger than (or may be equal to) a width $W_2$ of the laser light flux 60 in the same direction (i.e., the arrangement direction of the convex portions 35). Thus, the optical function surface 33a substantially does not diffract the laser light flux 60 but refracts the laser light flux 60. Therefore, a sensitivity of the optical function surface 33a is relatively low, compared to a sensitivity of a diffractive surface. Accordingly, an optical characteristic of the optical function surface 33a is stable with respect to turbulences and, as a result, a scanning optical system 30 which is highly resistant to (or stable with respect to) turbulences can be achieved.

In this specification, an optical function surface in which an optical function portion including a plurality of convex portions arranged therein so as to have a serrate cross section is formed and which substantially does not diffract but refracts incident light is referred to as a "discontinuous refractive surface". Moreover, an optical function surface in which an optical function portion including a plurality of convex portions arranged therein so as to have a serrate cross section is formed and which substantially does not generate diffraction light but reflects incident light is referred to as a "discontinuous reflection surface".

The optical function surface 33a functions not as a diffractive surface but as a refractive surface. Thus, in the optical function surface 33a, negative dispersion as large as that in a diffractive surface is not generated. Accordingly, chromatic aberration to be generated in the optical function surface 33a can be relatively suppressed to be small. As a result, the scanning optical system 30 with high optical performance can be achieved.

Furthermore, as described above, the optical function surface 33a, as a diffractive surface, has a shape obtained by adding an optical path difference function to a spherical surface, an aspherical surface or a free-form surface as a base and thus has the same aberration correction function as that of a diffractive surface.

As has been described, if the optical function surface 33a of this embodiment is used, instead of a diffractive surface, the scanning optical system 30, by extension the optical scanning apparatus 1, having high optical performance and being highly resistant to turbulences can be achieved.

Herein, as a specifically preferred embodiment, assuming that the width $W_1$ of each of the convex portions 35 in the arrangement direction of convex portions 35 is larger than the width $W_2$ of the laser light flux 60 which enters the optical function surface 33a (in the arrangement direction), description will be made. However, the width $W_1$ and the width $W_2$ may be substantially the same. Specifically, not only the width $W_1$=the width $W_2$, but also the width $W_1 > (\frac{2}{3}) \times$ the width $W_2$ (preferably, $W_1 > 0.77 \times$ the width $W_2$, more preferably, $W_1 > 0.83 \times$ the width $W_2$ and even more preferably, $W_1 > 0.91 \times$ the width $W_2$) may be hold. In this case, as described later, a dispersion characteristic of the optical function surface 33a is closer to a dispersion characteristic of refraction light, so that the scanning optical system 30, by extension the optical scanning apparatus 1, being highly resistant to turbulences, can be achieved.

Moreover, the scanning optical system 30 of this embodiment is particularly suitable to a so-called "multi-beam scanning apparatus" using a plurality of laser light fluxes having different wavelengths from one another. If a diffractive surface is used, a diffraction efficiency of the diffractive surface is dependent on a wavelength and, with respect to a laser light flux having any wavelength but a blaze wavelength, the diffraction efficiency tends to be reduced. However, in the optical function surface 33a having a refraction function, the optical function surface 33a has less wavelength dependency than the diffractive surface, and any laser light flux can be refracted with a high degree of efficiency.

In view of achieving higher optical performance, a width $W_3$ of the first side surface (main light incidence surface) 35a of each of the convex portions 35 in the arrangement direction of the convex portions 35 is preferably larger than the width $W_2$ of the laser light flux 60 which enters the optical function surface 33a (in the arrangement direction). Specifically, the width $W_2$ can be set to be about 2-3 mm and the width $W_3$ can be set to be about several mm to several tens mm, for example, about 5 mm. When the width $W_3$ is set to be large, a difference in level between adjacent ones of the convex portions 35 becomes large, so that optical performance is degraded and also fabrication becomes difficult. Therefore, it is more preferable that the widths $W_2$ and $W_2$ are close to each other.

Moreover, in view of achieving high optical performance, the optical function surface 33a is preferably formed so that an optical path difference between laser light fluxes 60 output from adjacent ones of the convex portions 35 is m (m is an integer) times as large as a wavelength of the laser light flux 60. Specifically, the optical function surface 33a is preferably formed so that the optical path difference between the laser light fluxes 60 each of which enters the first side surface 35a of an associated one of the adjacent ones of the convex portions 35 and is output from the associated one of the convex portions 35 is m (m is an integer) times as large as a wavelength of the laser light flux 60. Thus, respective phases of the laser light fluxes 60 which have been passed through respective first side surfaces 35a of the adjacent ones of the convex portions 35 can be matched to each other. Accordingly, an excellent light gathering characteristic can be achieved.

Moreover, in view of improving light use efficiency, it is preferable that the second side surface 35b is placed so as to be approximately parallel to an incident direction of the laser light flux 60 to the optical function surface 33a and is substantially kept from functioning as a refractive surface, so that an influx of the laser light flux 60 to the second side surface 35b is reduced. Furthermore, the second side surface 35b which is substantially not used as a refractive surface is preferably formed so that the laser light flux 60 is scattered therein. Specifically, for example, it is preferable that the second side surface 35b is made to be a rough surface so that the laser light flux 60 which enters the second side surface 35b is scattered. Alternatively, for example, it is preferable that a black pigment, a black dye or the like is applied to the second side surface 35b so that the second side surface 35b absorbs the laser light flux 60. With any one of the above-described structures, light which has entered the second side surface 35b that is substantially not used as a refractive surface can be prevented from reaching the target scanning surface 50. Accordingly, the degradation of optical performance of the optical scanning apparatus 1 due to incident light of the second side surface 35b can be suppressed.

In this embodiment, using the optical scanning apparatus 1 including the second imaging optical system 32 with only one discontinuous refractive surface as an example, description is given. However, the second imaging optical system 32 may include two or more discontinuous refractive surfaces.

In this embodiment, as long as the second imaging optical system 32 includes at least one discontinuous refractive surface, a structure of the second imaging optical system 32 is not particularly limited. However, as shown in FIG. 1, the second imaging optical system 32 may be formed of a scanning lens 33 of which the optical function surface 33a located closer to the deflector 31 is a discontinuous refractive surface and the optical function surface 33b located closer to the target scanning surface 50 is not a discontinuous refractive surface but a curved refractive surface and which has a fθ characteristic. Thus, with the second imaging optical system 32 formed of only a single scanning lens 33, the optical scanning apparatus 1 which is compact in size and is inexpensive can be achieved.

More specifically, the scanning lens 33 may be an anamorphic lens of which the optical function surface 33b is a toric surface and which has different powers in the main scanning direction and the sub-scanning direction. Specifically, because a periodic structure becomes linear and fabrication process is simplified, the scanning lens 33 is preferably formed so that an optical power of the optical function surface 33a applies only in the main scanning direction. Furthermore, in view of achieving low cost fabrication, it is preferable that the second imaging optical system 32 (specifically, in this embodiment, the scanning lens 33) is substantially formed of plastic.

It is preferable that the second imaging optical system 32 is formed so as to be asymmetric with respect to the main scanning direction, so that an excellent aberration characteristic can be achieved.

In this embodiment, the example where the second imaging optical system 32 is formed of a single scanning lens 33 has been described. However, the second imaging optical system 32 may be formed of a plurality of lenses. Moreover, the second imaging optical system 32 may be formed of one or more mirrors, or one or more lenses and one or more mirrors. When the second imaging optical system 32 is formed of one or more mirrors, a reflection surface(s) of the mirror(s) may be a discontinuous reflection surface(s).

In this embodiment, the example where the optical function surface 33a is a discontinuous refractive surface has been described. However, the optical function surface 33a may be a curved refractive surface and the optical function surface 33b may be a discontinuous-refractive surface. Moreover, each of the optical function surface 33a and the optical function surface 33b may be a discontinuous refractive surface.

The principle that diffraction light is substantially not generated but refraction light is generated in the optical function surface 33a which is a discontinuous refractive surface will be described. In this case, using a model (see FIG. 7) in which a parallel laser light flux 70 enters a surface 71 including a plurality of convex portions arranged therein, each of the convex portions having an approximately triangular cross section (i.e., a prism shape), description will be given.

The surface 71 has a shape obtained by adding an optical path difference function 5 for generating a desired optical path difference to an aspherical shape as a base. Assume that the origin is a point at which an optical axis and the surface 71 cross each other, the Z axis is an optical direction, the Y axis is a vertical direction to the optical axis in the main scanning cross section, the X axis is a vertical direction to the optical axis in the sub-scanning cross section, and Z1 is an amount of sag from a vertex, i.e., the origin. Then, the base aspheric shape is given by the following formulas, i.e., Formula 1, Formula 2 and Formula 3.

$$Z1 = f(y) + \frac{\left(\frac{x^2}{g(y)}\right)}{1 + \sqrt{1 - \left(\frac{x}{g(y)}\right)^2}}$$ [Formula 1]

$$f(y) = \frac{\left(\frac{y^2}{RDy}\right)}{1 + \sqrt{1 - (1+k)\left(\frac{y}{RDy}\right)^2}} + ACy^3 + ADy^4 + AEy^5 +$$
$$AFy^6 + AGy^7 + AHy^8 + AIy^9 + AJy^{10} + AKy^{11} + ALy^{12}$$ [Formula 2]

$$g(y) = RDx(1 + BAy + BBy^2 + BCy^3 + BDy^4 + BEy^5 + BFy^6 + BGy^7 + BHy^8)$$ [Formula 3]

In Formulas 1, 2 and 3, f(y) is a formula expressing a non-circular arc in the main scanning direction where x=0 holds, g(y) is a formula expressing a curvature radius in the sub-scanning direction at a y location, RDy is a curvature radius in the main scanning direction at the origin, RDx is a curvature radius in the sub-scanning direction where y=0 holds, AD, AE, AF, AG, AH, AI, AJ, AK and AL are high order coefficients for determining a non-circular arc in the main scanning direction, BA, BB, BC, BD, BE, BF, BG and BH are coefficients for determining a curvature radius in the sub-scanning direction at the y location.

Next, the optical path difference function will be described. Assume that the optical path difference function is OPD. Then, the optical path difference function is given by Formula 4.

$$OPD(y) = HAy^2 + HBy^3 + HCy^4 + HDy^5 + HEy^6$$ [Formula 4]

In Formula 4, HA, HB, HC, HD and HE are high order coefficients for determining an optical path difference function. Assume that an amount of sag from an origin determined from the optical path difference function is Z2. Then, Z2 is expressed by Formula 5.

$$Z2 = \frac{-OPD(y) + mj\lambda}{(n-1)}$$ [Formula 5]

In Formula 5, $\lambda$ is a wavelength of the laser light flux 70, n is a refractive index of an element including the surface 71, j is a value obtained by dropping the fractional portion of a quotient (an integer) obtained by dividing OPD by $\lambda$, and m is 1 or a larger integer than 1.

By determining Z2 based on Formula 5, a difference in optical path of a laser light flux output from each of convex portions between adjacent ones of the convex portions becomes m times as large as $\lambda$. However, when Z2 is determined based on Formula 5, an error in the optical path difference with respect to a light beam tilted from an optical axis is generated. To reduce such an error, it is actually preferable to use a formula in consideration of influences of an angle of the light beam. However, in the description of this principle, for the purpose of convenience, the simple Formula 5 is used.

Figure 5:
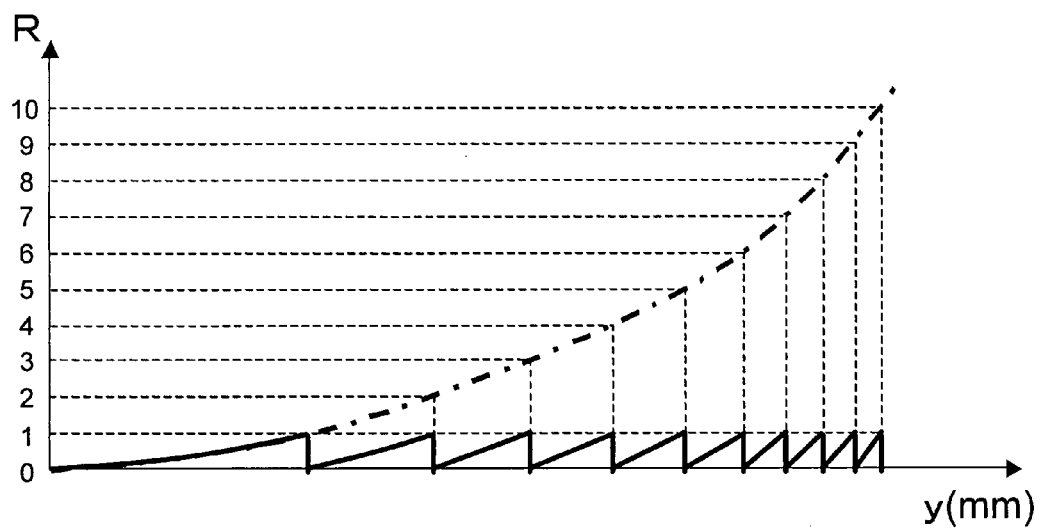
FIG. 5 is a graph illustrating Formula 6 where m=1 holds.
Figure 6:
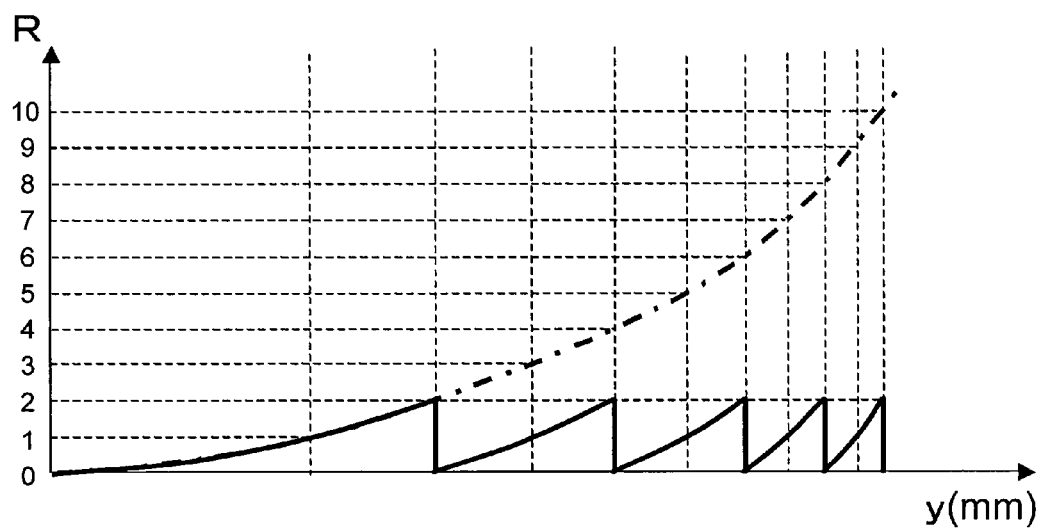
FIG. 6 is a graph illustrating Formula 6 where m=2 holds.

Subsequently, Formula 6 is defined as follows. Formula 6 is obtained by standardizing the numerator of Formula 5 with a wavelength. Each of FIGS. 5 and 6 shows a graphic representation of Formula 6. Note that in FIG. 5, the case where m=1 holds is shown and in FIG. 2, the case where m=2 holds is shown.

$$R(y) = \frac{-OPD(y) + mj\lambda}{\lambda}$$ [Formula 6]

In Each of FIGS. 5 and 6, a dashed curve indicates $-OPD(y)$ and a solid line indicates $R(y)$. In FIGS. 5 and 6, when m=1 holds, the difference in optical path of the laser light flux output from the convex portions between adjacent ones of the convex portions is equal to a wavelength. When m=2 holds, the difference in optical path of the laser light flux output from each of the convex portions between adjacent ones of the convex portions is equal to two wavelengths. As a large value is adopted for m, a cycle of R(y) becomes larger. In this case, the value of m is determined so that the cycle of R(y), i.e., a cycle d of the convex portions is equal to or larger than a width of the laser light flux 70 in the main scanning direction in the surface 71.

Figure 7:
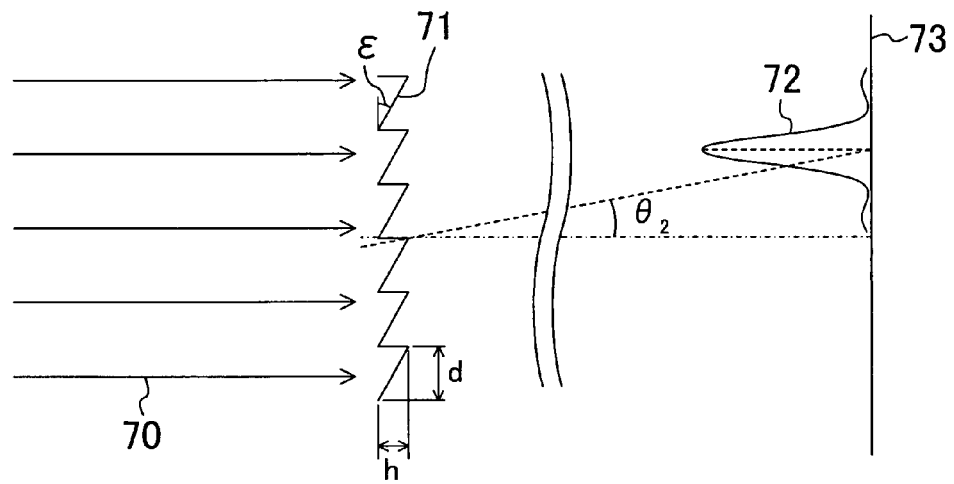
FIG. 7 is a view illustrating how a parallel and monochromic laser light flux 70 enters a surface 71 and is diffracted.

Next, change in diffraction effect with respect to the number of ones of the convex portions corresponding to the laser light flux 70 in the surface 71 is analyzed (the number of ones of the convex portions corresponding to the width of the laser light flux 70 will be herein called "cycle number"). FIG. 7 is a view illustrating how the parallel and monochromic laser light flux 70 enters the surface 71 and is diffracted. Assume that a wavelength of the laser light flux 70 is $\lambda$, a cycle of the convex portions is d and a diffraction order is m. Then, when d>>m$\lambda$ holds, a diffraction angle is given by Formula 7. Moreover, assume that a vertex of each of the convex portions is $\epsilon$, a height of the convex portions is h and a refraction index of a material of the element including the surface 71 is n($\lambda$). When $\epsilon$ is minute, the refraction angle made by each of the convex portions is given by Formula 8.

$$\theta d \approx \frac{m\lambda}{d}$$ [Formula 7]

$$\theta r \approx (n(\lambda) - 1)\epsilon \approx (n(\lambda) - 1)\frac{h}{d}$$ [Formula 8]

Then, where the difference in optical path of the laser light flux output from each of the convex portions between adjacent ones of the convex portions depending on the height h of the convex portions is an integral multiple of a wavelength, (for example, equal to or twice as large as the wavelength), i.e., Formula 9 is satisfied, a diffraction angle $\theta_d$ and a refraction angle $\theta_r$ match each other, so that the diffraction efficiency becomes maximum at this time.

$$(n(\lambda b)-1)h = m\lambda b \quad \text{[Formula 9]}$$

In Formula 9, m is a diffraction order, $\lambda b$ is a blaze wavelength, and $n(\lambda b)$ is a refraction efficiency of the material of the element including the surface 71 at $\lambda b$.

When the height h of the convex portions does not satisfy Formula 9, the diffraction angle $\theta_d$ and the refraction angle $\theta_r$ do not match each other. For example, when the difference in optical path of the laser light fluxes output from each of the convex portions between adjacent ones of the convex portions depending on the height h of the convex portions is half of the wavelength, i.e., satisfies the following Formula 10, the laser light flux 70 is diffracted so that almost all part of the light flux becomes zero order diffraction light or first order diffraction light.

$$h = \frac{\lambda b}{2(n(\lambda b) - 1)} \quad \text{[Formula 10]}$$

Next, using an analysis model of FIG. 8, the correlation between the cycle number (the number of ones of the convex portions corresponding to the width of the laser light flux 70 which enters the surface 71) and a far-field pattern 72 will be described. The far-field pattern 72 can be calculated in the following manner. First, an image intensity distribution (far-field pattern 72) in an imaging surface 75 when the laser light flux 70 which has passed through the surface 71 is gathered by a light gathering lens 74 is calculated and then the image intensity distribution in the imaging surface 75 is converted into an angle distribution in a far field 73, thereby obtaining the far-field pattern 72. Specifically, calculation of the image intensity distribution in the far field 73 can be performed based on the following Formula 11.

$$I(Y) = \left( \int \exp\left( i \frac{2\pi}{\lambda} \left( \frac{(Y-y)^2}{2f} + \frac{y^2}{2f} + pd(y) \right) \right) dy \right)^2 \quad \text{[Formula 11]}$$

Figure 8:
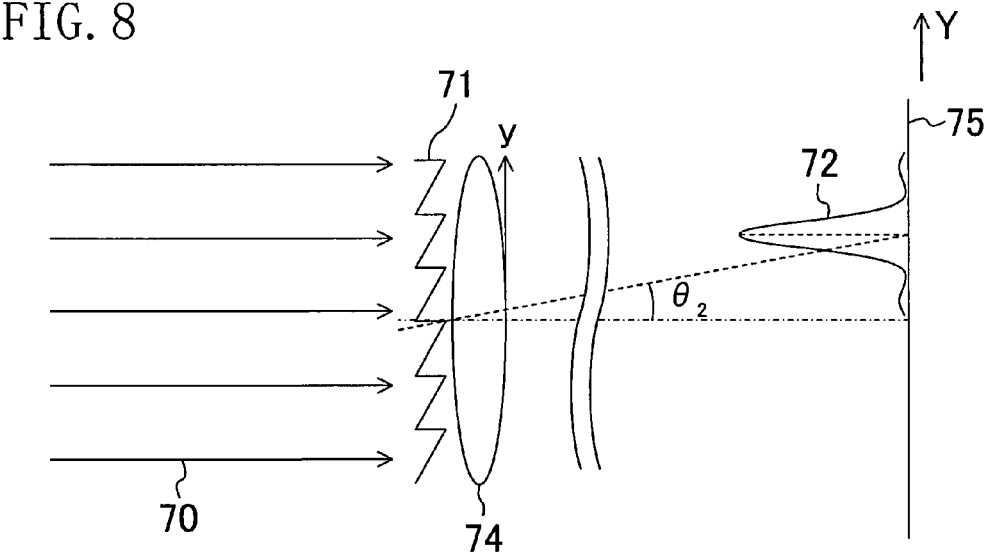
FIG. 8 is a diagram showing an angle distribution in a far-field pattern 72 caused by the surface 71.

In this case, as shown in FIG. 8, Y is a coordinate axis on the far field 73, I is an intensity at a location Y in the far field 73, y is a coordinate axis on a pupil surface of the light gathering lens 74, $\lambda$ is a wavelength of the laser light flux 70, f is a focal length of the light gathering lens 74 and pd is an optical path difference at the location y which is added to the laser light flux 70 by the surface 71.

The location Y in the far field 73 can be converted into an angle $\theta$ based on the following Formula 12.

$$\theta = \tan^{-1}\left(\frac{Y}{f}\right) \quad \text{[Formula 12]}$$

Figure 9:
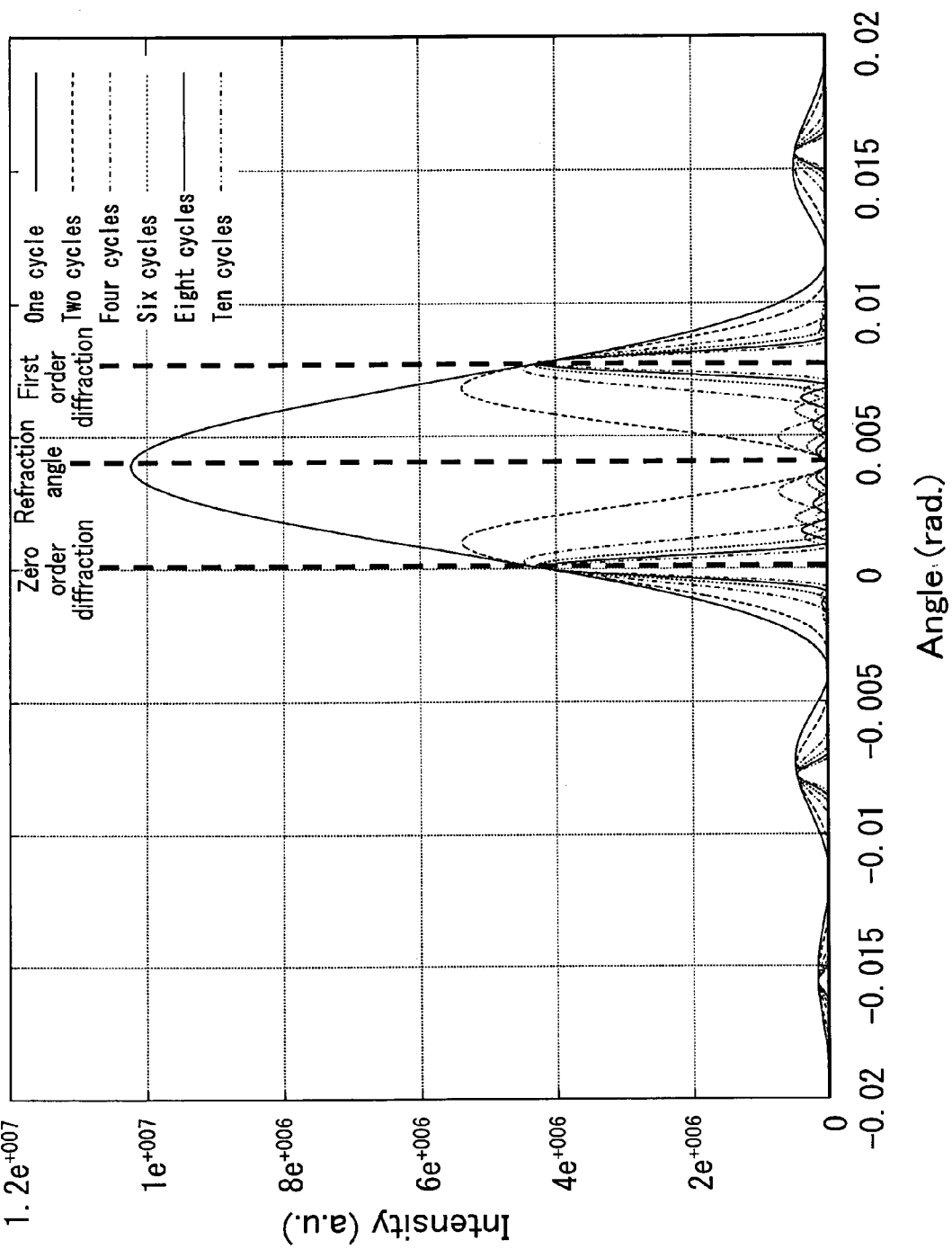
FIG. 9 is a graph showing the correlation between cycle number and image intensity.

FIG. 9 is a graph showing the correlation between the cycle number and the image intensity.

Conditions for calculation of data shown in FIG. 9 are: the wavelength $\lambda$ of the laser light flux 70 is 780 nm, the focal length f of the light gathering lens 74 is 100 nm, the refraction efficiency $n(\lambda)$ of the element including the surface 71 is 1.52499, the cycle of the convex portions of the surface 71 is 0.1 mm. The height h of the convex potions is set so as to satisfy Formula 10.

FIG. 9 is a graph for a zero order diffraction angle and a first order diffraction angle calculated based on Formula 7, and a refraction angle calculated based on Formula 8. FIG. 9 shows that when the cycle number is large, almost all part of the laser light flux 70 is diffracted to zero diffraction light or first diffraction light. As the cycle number is reduced, a peak position of the far-field pattern 72 becomes closer to the refraction angle. Specifically, the peak position becomes closer to the refraction angle at 4 cycles or less and the peak value of the far-field pattern 72 completely matches with the refraction angle at one cycle.

Figure 10:
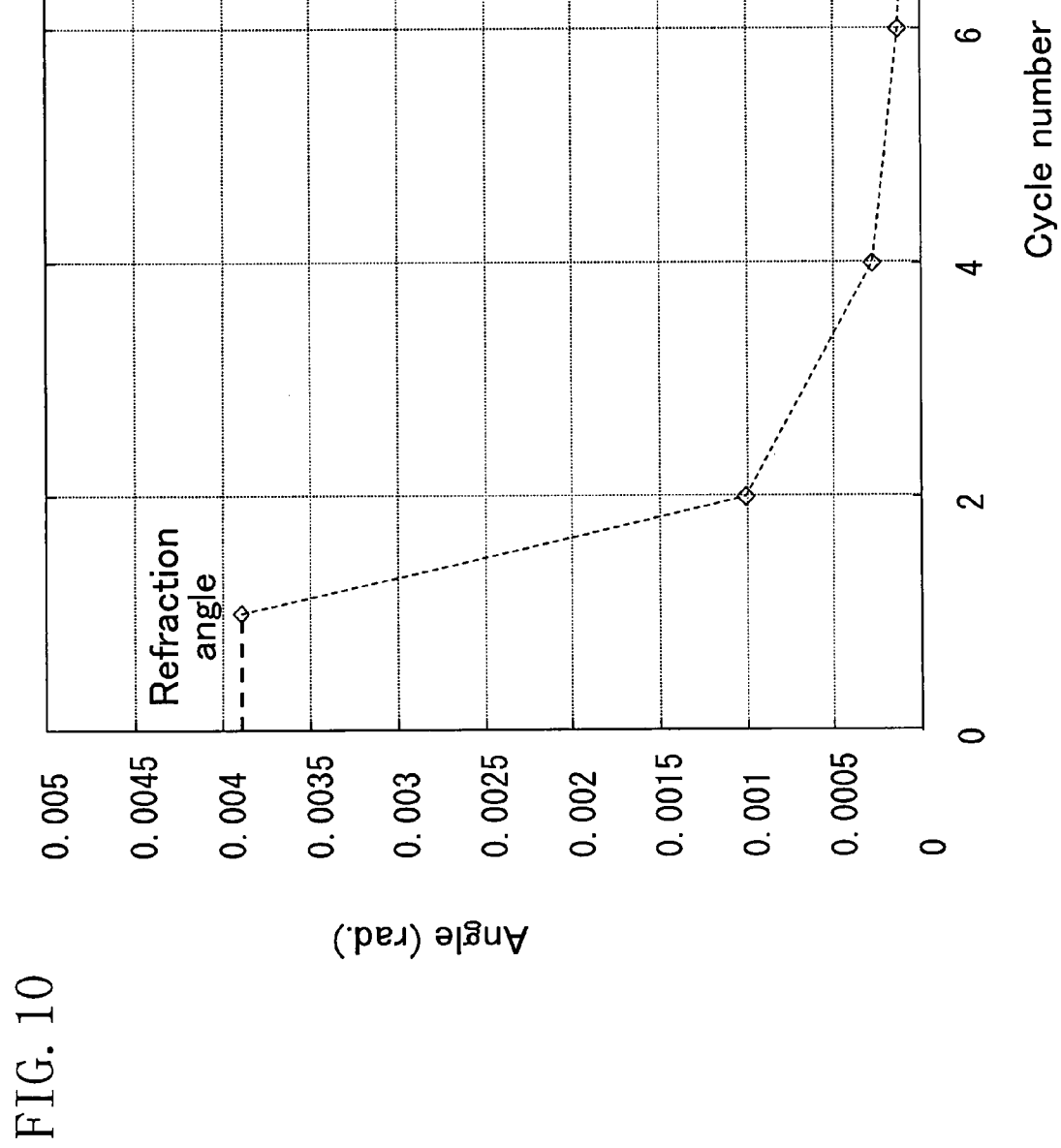
FIG. 10 is a graph showing the correlation between a peak position (a degree of diffraction angle or a degree of refraction angle) of intensity distribution for the far-field pattern 72 of zero order diffraction light and the cycle number.

FIG. 10 is a graph showing the correlation between a peak position (a degree of diffraction angle or a degree of refraction angle) of the intensity distribution for the far-field pattern 72 of zero order diffraction light and the cycle number. In FIG. 10, the refraction angle calculated based on Formula 8, is indicated by a dotted line.

As shown in FIG. 10, when the cycle number is large, the laser light flux is diffracted to the 0 degree direction, which is a diffraction angle of the zero order diffraction light. However, as the cycle number is reduced, the peak position is shifted from the diffraction angle of the zero diffraction light and completely corresponds to a refraction angle at one cycle (i.e., when the cycle number is 1).

As has been described, when the cycle number is relatively large, the surface 71 functions as a diffractive surface and the laser light flux 70 is diffracted in the direction of the diffraction angle expressed by Formula 7. As the cycle number is reduced, the peak position becomes less in accordance with Formula 7 and, at one cycle, the peak position totally follows the refraction principle expressed by Formula 8, i.e., the laser light flux 70 is refracted in the refraction angle expressed by Formula 8.

Next, the case where the height h of the convex portions is determined based on Formula 9, under the condition where $\lambda b=780$ nm and $n(\lambda b)=1.52499$ hold and the wavelength $\lambda$ of the laser light flux 70 is 880 nm will be considered. For a pitch between the convex portions in the surface 71 and the focal length f of the light gathering lens 74, the same values as those in FIGS. 9 and 10 are used.

Figure 11:
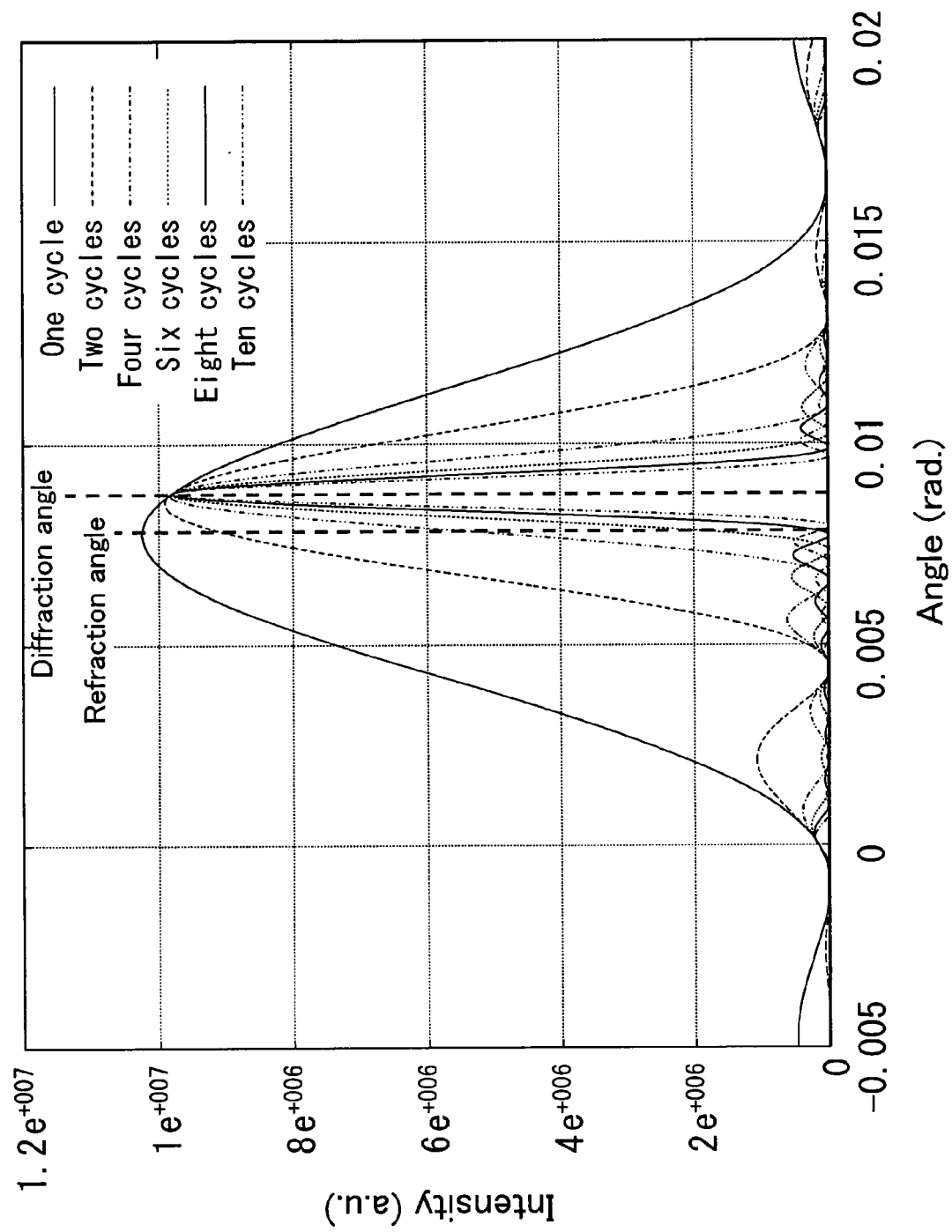
FIG. 11 is a graph showing the correlation between cycle number and image intensity.

FIG. 11 is a graph showing the correlation between the cycle number and the image intensity in this case. As in FIG. 9, in FIG. 11, the diffraction angle of diffraction due to the surface 71 calculated from Formula 7 and the refraction angle of refraction due to a prism corresponding to one cycle in the surface 71 calculated from Formula 8 are indicated by dotted lines.

The refractive index $n(\lambda)$ of the material of the element including the surface 71 in Formula 8 is a refractive index with respect to a wavelength of 880 μm. Then, where $dn(\lambda)/d\lambda=-2\,e^{-5}$ (nm$^{-1}$) holds, a refractive index with respect to a wave length of 780 nm is 1.52199. Note that $dn(\lambda)/d\lambda$ expresses change in refractive index per unit wavelength.

In this case, as shown in FIG. 11, when the cycle number is large, the laser light flux 70 is diffracted in the diffraction angle direction. Then, as the cycle number is reduced, the peak position of the far-field pattern 72 becomes closer to the refraction angle and, at one cycle, a peak value of the far-field pattern 72 completely matches with the refraction angle.

Next, analysis has been performed for the case where a different pitch of the convex portions and a different diffraction order from those in the case of FIG. 11 were used.

Figure 12:
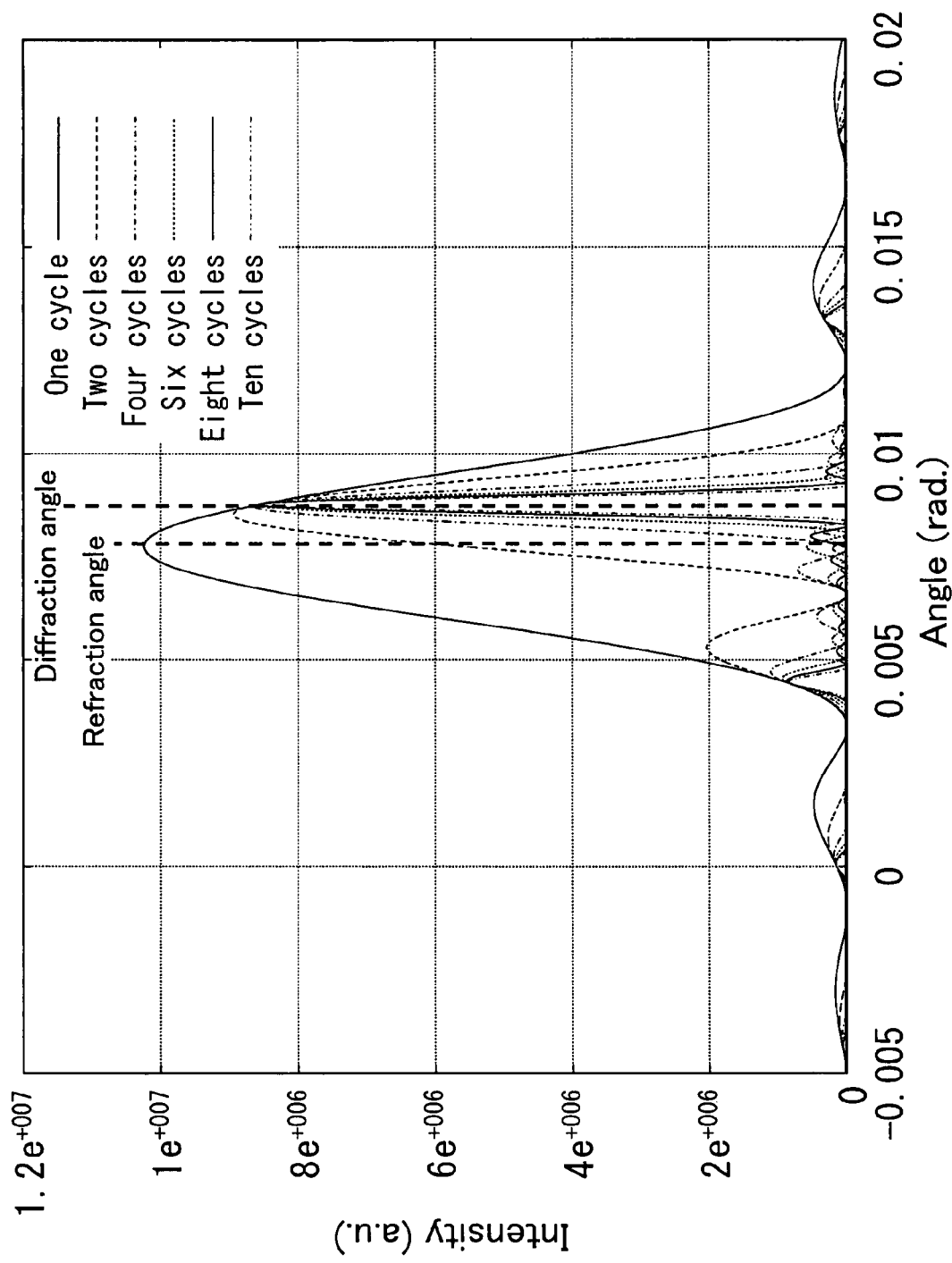
FIG. 12 is a graph showing the correlation between cycle number and image intensity.

Specifically, in this case, the pitch of the convex portions was 0.2 mm and the diffraction order was 2. Other conditions for analysis were the same as those for the analysis of which results are shown in FIG. 11. Results of this case are shown in FIG. 12. In the analysis of FIG. 12, the pitch and the order are set to be the doubles of the pitch and the order used in the analysis of FIG. 11, respectively, so that the diffraction angle is the same. Moreover, the vertex E of the convex portions is the same in the cases of FIGS. 11 and 12, so that the refraction angle in FIG. 12 is the same as that in FIG. 11.

As shown in FIG. 12, in this case, as in the case of FIG. 11, when the cycle number is large, the laser light flux 70 is diffracted in the diffraction angle direction. As the cycle number is reduced, the peak position of the far-field pattern 72 becomes closer to the refraction angle and, at one cycle, a peak value of the far-field pattern 72 becomes to almost completely match with the refraction angle.

Figure 13:
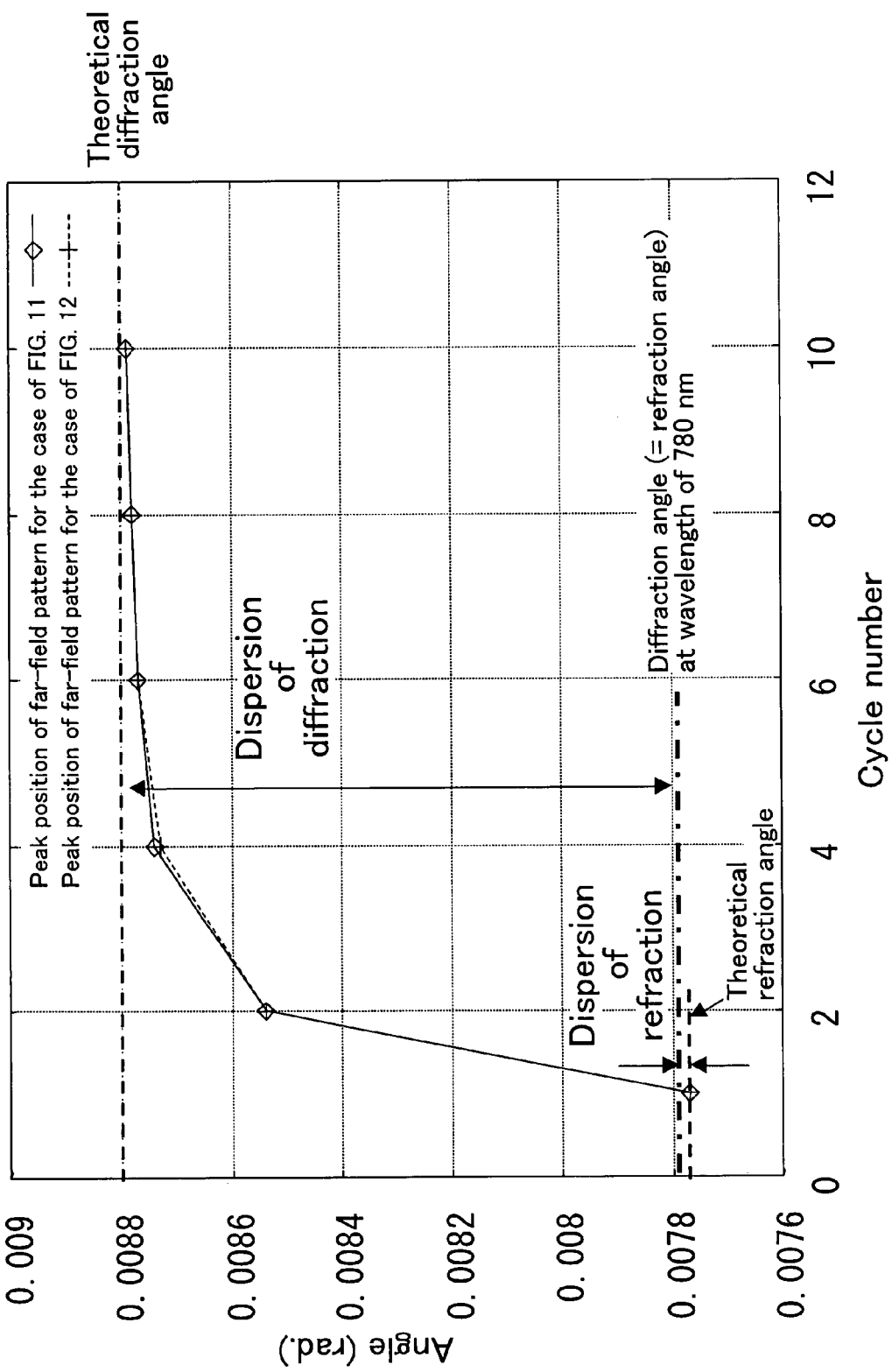
FIG. 13 is a graph showing the correlation between peak position of intensity distribution for the far-field pattern and cycle number for the cases of FIG. 11 and FIG. 12.

FIG. 13 is a graph showing the correlation between the peak position of the far-field image intensity distribution and the cycle number for the cases of FIGS. 11 and 12. In FIG. 13, the diffraction angle obtained using Formula 7 and the refraction angle obtained using Formula 8 are indicated by dotted lines. The diffraction angle obtained when a parallel light flux having a wavelength of 780 nm enters the surface 71 is indicated by a dashed line. In this case, the diffraction angle and the refraction angle match with each other.

Also, in FIG. 13, peak position of far-field pattern for the case of FIG. 11 and peak position of far-field pattern for the case of FIG. 12 almost completely match with each other. When the cycle number, i.e., the number of ones of the convex portions corresponding to the laser light flux 70 is large, the peak position matches with a theoretical diffraction angle. As the cycle number is reduced, the peak position becomes closer to a theoretical refraction angle and, at one cycle, the peak position almost completely matches with the refraction angle.

As has been described, despite of the pitch and the diffraction order thereof, when the cycle number is large, the surface 71 functions as a diffractive surface and the laser light flux 70 is diffracted in the direction of the diffraction angle expressed by Formula 7. As the cycle number is reduced, the peak position becomes less in accordance with Formula 7 and, at one cycle, the peak position almost completely follows the refraction principle expressed by Formula 8.

Moreover, in FIG. 13, a difference in angle between the diffraction angle (=refraction angle) when a parallel light flux having a wavelength of 780 nm enters the surface 71, indicated by a dashed line, and the diffraction angle when a parallel light flux having a wavelength of 880 nm enters the surface 71, indicated by a dotted line, is a dispersion characteristic due to diffraction. A difference in angle between the diffraction angle (=refraction angle) when a parallel light flux having a wavelength of 780 nm enters the surface 71, indicated by a dashed line, and the refraction angle when a parallel light flux having a wavelength of 880 nm enters the surface 71, indicated by a dotted line, is a dispersion characteristic due to refraction. Where d>>mλ holds, the dispersion characteristic of the diffraction angle is given by Formula 13. Where ε is minute, dispersion characteristic of the refraction angle is given by Formula 14.

$$\Delta\theta d \approx \frac{m}{d}\Delta\lambda \quad \text{[Formula 13]}$$

-continued $$\Delta\theta r \approx \frac{\partial n(\lambda)}{\partial \lambda}\varepsilon\Delta\lambda \quad \text{[Formula 14]}$$

In this case, Δλ=100 nm holds and thus the diffraction angle and the refraction angle at a wavelength of 880 nm indicated by a dotted line are obtained by adding a value of an angle difference obtained by assigning Δλ=100 nm to each of Formula 13 and Formula 14 to the diffraction angle (=refraction angle) when a parallel light flux having a wavelength of 780 nm enters the surface 71, indicated by the dashed line in FIG. 13. From this fact, the following is understood. That is, a dispersion characteristic of the surface 71 also follows the diffraction principle when the cycle number is large, and as the cycle number is reduced, it becomes less in accordance with the diffraction principle. Then, it almost completely follows the refraction principle at one cycle.

In Japanese Laid-Open Publication No. 2005-37561 described in BACKGROUND OF THE INVENTION, using a Fresnel lens as a lens surface of a scanning lens, a pitch of a periodic structure of the Fresnel lens is increased so as to be larger than 1/20 of a light flux width, so that almost all influences of diffraction and interference are prevented. However, as understood from the analysis results of FIGS. 9 through 13, even if the pitch of the periodic structure of the Fresnel lens is made to be about 1/10 of the light flux width, the diffraction action is dominant.

Next, an application example of the optical scanning apparatus 1 described in this embodiment will be described. Specifically, hereafter, an image formation apparatus 2 using the optical scanning apparatus 1 will be described.

Figure 14:
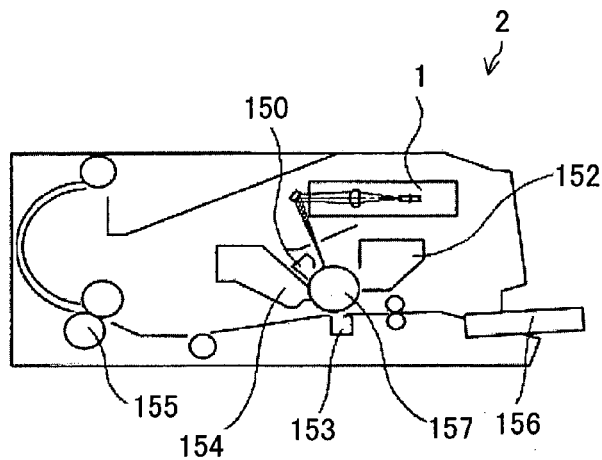
FIG. 14 is a view illustrating a structure of an image formation apparatus 2.

FIG. 14 is a view illustrating a structure of the image formation apparatus 2.

The image formation apparatus 2 includes the optical scanning apparatus 1, a primary charger 150, a developer 152, a transfer charger 153, a cleaner 154, a fixer 155, a paper feeder 156 and a photoconductive drum 157.

In the image formation apparatus 2, first, an electrostatic latent image is formed and printing information is written as the electrostatic latent image on the photoconductive drum 157. A surface of the photoconductive drum 157 is covered by a photoreceptor in which charges are changed when light is irradiated to the photoreceptor. With the primary charger 150, static ions are attached to the surface of the photoconductive drum 157 and the photoconductive drum 157 is charged. In the photoconductive drum 157 which has been charged, a charged toner is attached to a printing portion and developed. The toner attached to the photoconductive drum 157 is transferred to a sheet of paper supplied form the paper feeder 156 by the transfer charger 153. The transferred toner is fixed to the sheet of paper by the fixer 155. The remaining toner is removed by the cleaner 154.

The image formation apparatus 2 uses the optical scanning apparatus 1. Accordingly, the size and a running cost of the image formation apparatus 2 is reduced and a resolution thereof is increased.

IMPLEMENTATION EXAMPLE

Hereafter, the present invention implemented as a scanning optical system will be described more specifically with reference to construction data, various types of aberration diagrams and the like. A numerical embodiment used here corresponds to that used in the above-described embodiment. In Table 1, optical specifications of this example are given. In Table 2, parameters for expressing a shape of the optical function surface 33a in this implementation example are given. In Table 3, parameters for expressing a shape of the optical function surface 33b in this implementation example are given.

TABLE 1

| λ | 780e−6 mm | fm | 104.7 mm | Yo | 220.0 mm |
|---|---|---|---|---|---|
| θ° | 120.4 deg. | rp | 14 mm | Δx | 2.0 mm |
| α | 40 deg. | L1 | 126.3 mm | L2 | 83.4 mm |
| TH | 20.0 mm | | | | |

TABLE 2

| RDy | 158.14789 mm | k | 0 | AC | 0 | AD | −2.2615E−06 | AE | 0 |
|---|---|---|---|---|---|---|---|---|---|
| AF | 4.7270E−10 | AG | 0 | AH | −4.1420E−14 | AI | 0 | AJ | 5.2745E−19 |
| AK | 0 | AL | −1.3132E−22 | RDx | 23.00014 mm | BA | 0 | BB | 2.5201E−04 |
| BC | 0 | BD | −8.7638E−07 | BE | 0 | BF | 6.6051E−10 | BG | 0 |
| BH | −1.3118E−13 | HA | 6.0825E−05 | HB | 6.3774E−07 | HC | −2.6526E−08 | HD | −1.5759E−10 |
| HE | 2.4994E−12 | m | 1 | | | | | | |

TABLE 3

| RDy | −161.40209 | k | 0 | AC | −2.2166E−07 | AD | −5.4566E−07 | AE | 2.3714E−10 |
|---|---|---|---|---|---|---|---|---|---|
| AF | −4.2833E−10 | AG | 0 | AH | 2.5593E−14 | AI | 0 | AJ | −1.4009E−18 |
| AK | 0 | AL | −2.8029E−21 | RDx | 11.02754 mm | BA | 4.9057E−04 | BB | −1.6098E−04 |
| BC | −1.3939E−07 | BD | 2.0873E−07 | BE | −1.8761E−11 | BF | −6.2060E−11 | BG | 0 |
| BH | 1.6717E−14 | | | | | | | | |

In Table 1, Table 2 and Table 3, λ (mm) is a design wavelength, Yo (mm) is an effective scanning width, θo (deg.) is a deflection angle corresponding to the effective scanning width, rp (mm) is an inradius of the deflector 31, α (deg.) is a reflection angle of the laser light flux 70 at a scanning center in a deflection surface of the deflector 31, L1 (mm) is a distance between the deflection surface of the deflector 31 and the target scanning surface 50, L2 (mm) is a distance between a vertex in the optical function surface 33b of a scanning lens 33 and the target scanning surface 50, and TH (mm) is a center thickness of the scanning lens 33.

Note that fm (mm) is given by the following Formula 15.

$$fm = \frac{180 Yo}{\pi \theta o} \quad [\text{Formula 15}]$$

In the numerical embodiment, the deflector 31 is placed so that a reflection point at the scanning center is distant from a center of the deflection surface and is shifted by Δx (mm) in the direction away from a light source 10.

Figure 15:
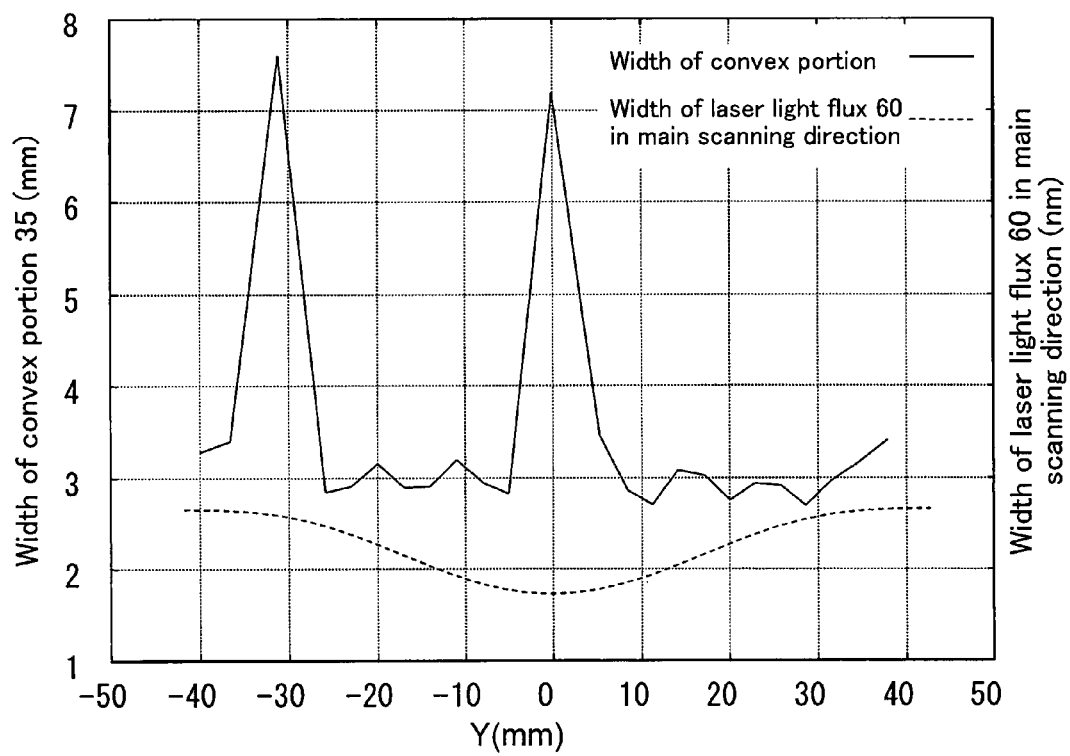
FIG. 15 is a graph showing a width of each of convex portions 35 with respect to a location of the optical function surface 33a in the Y axis direction and a width of the laser light flux 70 which enters the optical function surface 33a in the main scanning direction.

In FIG. 15, a width of each of the convex portions 35 with respect to a location of the optical function surface 33a in the Y axis direction and the width of the laser light flux 70 which enters the optical function surface 33a in the main scanning direction. FIG. 15 shows that the scanning optical system is designed so that in an entire effective range of the optical function surface 33a, the width of each of the convex portions 35 is larger than the width of the laser light flux 70 in the main scanning direction.

Figure 16:
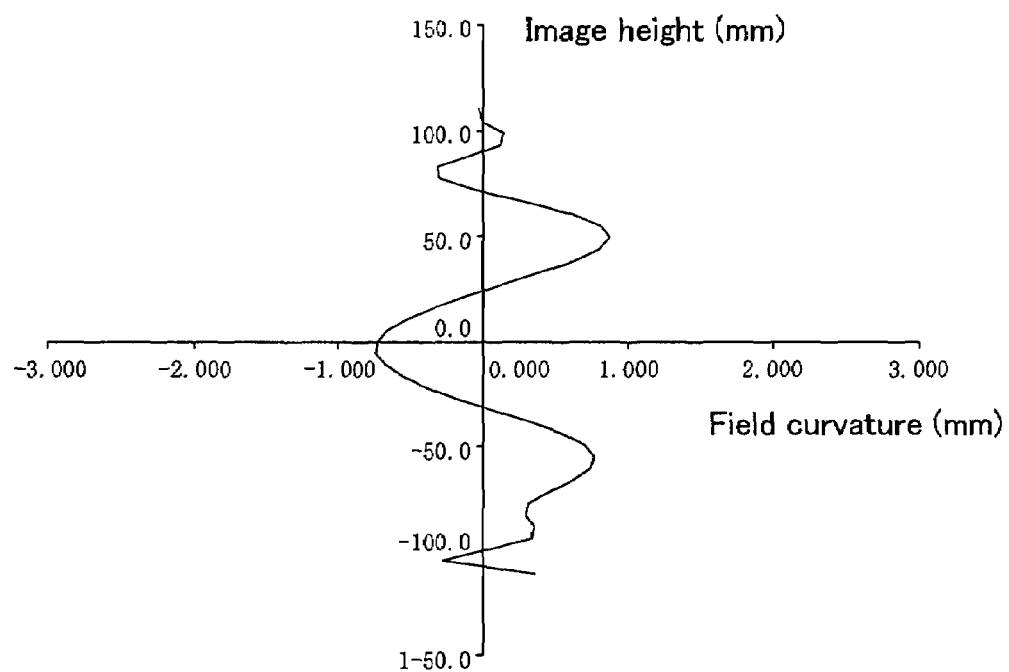
FIG. 16 is a graph showing an amount of field curvature of the optical scanning system in an implementation example.
Figure 17:
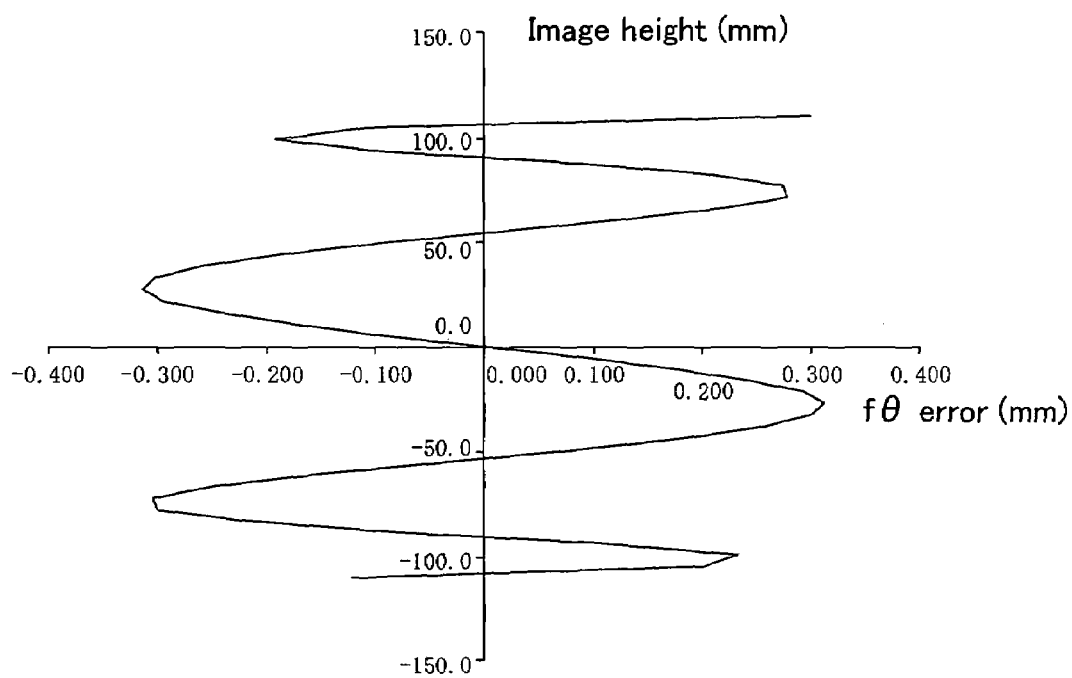
FIG. 17 is a graph showing fθ characteristics of the optical scanning apparatus of the implementation example.

In FIG. 16, an amount of field curvature of the optical scanning system in the implementation example is shown. In FIG. 17, fθ characteristics of the scanning optical system of this implementation example are shown. It is understood from FIG. 16 and FIG. 17 that an amount of field curvature and fθ characteristics are preferably corrected.

COMPARISON EXAMPLE

In Table 4, optical specifications of this comparison example are given. In Table 5, parameters for expressing a shape of an optical function surface 33a in this comparison example are given. In Table 6, parameters for expressing a shape of an optical function surface 33b in this comparison example are given.

TABLE 4

| λ | 780e−6 mm | fm | 104.7 mm | Yo | 220.0 mm |
|---|---|---|---|---|---|
| θ° | 120.4 deg. | rp | 14 mm | Δx | 2.0 mm |
| α | 40 deg. | L1 | 126.3 mm | L2 | 83.4 mm |
| TH | 20.0 mm | | | | |

TABLE 5

| RDy | 162.61603 mm | k | 0 | AC | 0 | AD | −2.0667E−06 | AE | 0 |
|---|---|---|---|---|---|---|---|---|---|
| AF | 4.6260E−10 | AG | 0 | AH | −4.4123E−14 | AI | 0 | AJ | 2.0461E−20 |
| AK | 0 | AL | 1.3479E−23 | RDx | −23.00014 mm | BA | 0 | BB | 1.8630E−04 |
| BC | 0 | BD | −8.0080E−07 | BE | 0 | BF | 6.7393E−10 | BG | 0 |
| BH | −1.4105E−13 | | | | | | | | |

TABLE 6

| RDy | -154.94592 | k | 0 | AC | -9.9292E-07 | AD | -6.0586E-07 | AE | 1.7355E-10 |
|---|---|---|---|---|---|---|---|---|---|
| AF | -2.7492E-10 | AG | 0 | AH | -9.4570E-15 | AI | 0 | AJ | 1.0409E-19 |
| AK | 0 | AL | 4.4917E-23 | RDx | 11.02754 mm | BA | 4.9975E-04 | BB | -1.5739E-04 |
| BC | -8.9122E-08 | BD | 2.0442E-07 | BE | -2.6075E-11 | BF | -6.6263E-11 | BG | 0 |
| BH | 1.9262E-14 | | | | | | | | |

Figure 18:
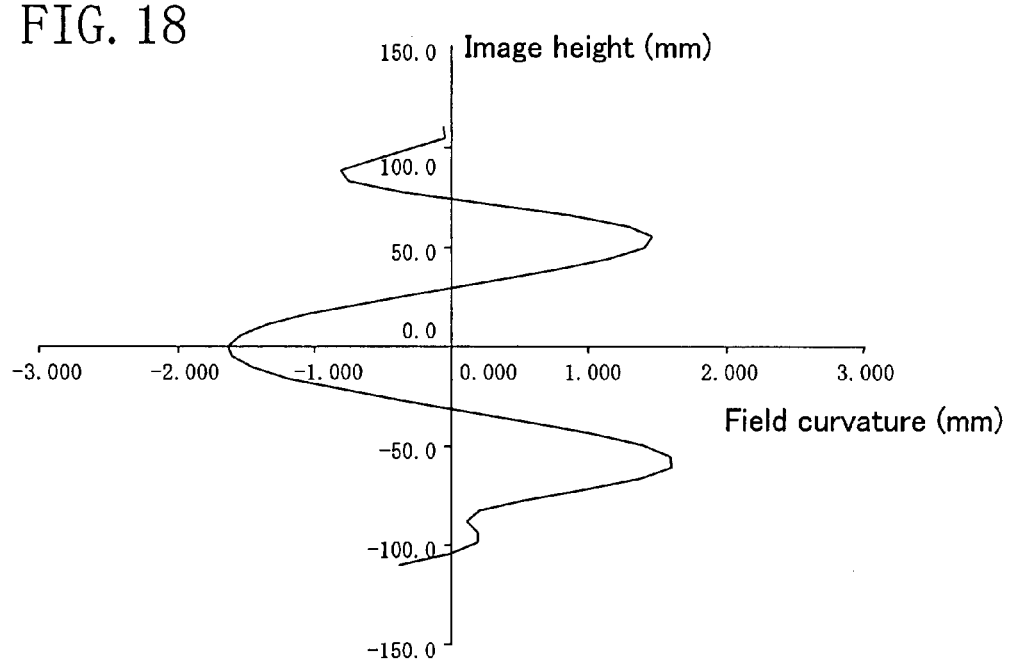
FIG. 18 is a graph showing an amount of field curvature of an optical scanning system in a comparison example.
Figure 19:
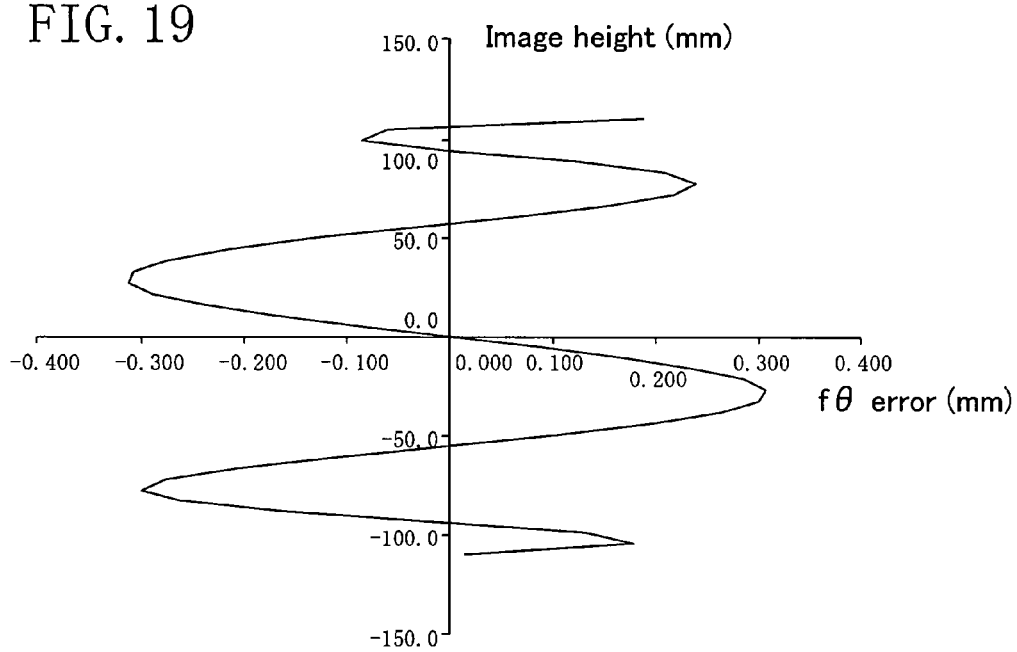
FIG. 19 is a graph showing fθ characteristics of the optical scanning apparatus of the comparison example.

In FIG. 18, an amount of field curvature of the optical scanning system in the comparison example in the main scanning direction is shown. In FIG. 19, fθ characteristics of the optical scanning system in this comparison example in the main scanning direction are shown. It is understood from FIG. 18 and FIG. 19 that an amount of field curvature and fθ characteristics are not corrected in the comparison example, compared to the implementation example.

The present invention is not limited to the above-described embodiment and various modifications are possible without departing from the spirit and material features of the present invention. The above-described embodiment is merely an example in all aspects and its interpretation is not to be limited. The scope of the present invention is indicated by the scope of claims and not limited by the specification. Furthermore, all changes and modifications belonging to the scope of equivalents of the claims fall within the scope of the present invention.

What is claimed is:

1. A scanning optical system for deflecting a light flux from a light source and scanning a target scanning surface, the scanning optical system comprising:
    a deflector for deflecting the light flux from the light source; and
    an imaging optical system for focusing the light flux deflected by the deflector on the target scanning surface,
    wherein the imaging optical system has at least one optical function surface on which an optical function portion including a plurality of convex portions arranged therein so as to have a serrate cross section is formed in at least part thereof and said at least one optical function surface is formed so that a width of each of the convex portions in an arrangement direction in which the convex portions are arranged is substantially equal to or larger than a width of the light flux in the arrangement direction, which enters the optical function surface.

2. The scanning optical system of claim 1, wherein the optical function surface is formed substantially so as not to diffract the light flux deflected by the deflector.

3. The scanning optical system of claim 1, wherein the optical function portion is formed at least in an entire region of the optical function surface in which the light flux enters.

4. The scanning optical system of claim 1, wherein the plurality of convex portions are arranged in a direction approximately parallel to a main scanning direction.

5. The scanning optical system of claim 1, wherein said at least one optical function surface is formed so that an optical path difference between light fluxes output from adjacent ones of the convex portions is an integral multiple of a wavelength of the light flux.

6. The scanning optical system of claim 1, wherein each of the convex portions is a filiform convex portion including a first side surface and a second side surface each of which has a long strip-like shape so as to have an approximately triangular cross section.

7. The scanning optical system of claim 6, wherein the first side surface is located so that the light flux deflected by the deflector enters first side surface and a width of the first side surface in the arrangement direction is substantially equal to or larger than the width of the light flux in the arrangement direction, which enters the optical function surface.

8. The scanning optical system of claim 6, wherein the second side surface is formed so that the light flux deflected by the deflector is scattered.

9. The scanning optical system of claim 6, wherein the second side surface is formed so as to absorb the light flux deflected by the deflector.

10. The scanning optical system of claim 1, wherein the optical function surface is asymmetrical with an optical axis of the imaging optical system in a main scanning direction.

11. The scanning optical system of claim 1, wherein the imaging optical system is formed of a single lens including the optical function surface.

12. The scanning optical system of claim 1, wherein the imaging optical system is formed of a plurality of lenses.

13. The scanning optical system of claim 1, wherein the imaging optical system is formed of one or more lenses and/or one or more mirrors.

14. The scanning optical system of claim 1, wherein the imaging optical system is formed of plastic.

15. The scanning optical system of claim 1, wherein the optical function portion is a surface for refracting or reflecting the light flux.

16. An image formation apparatus comprising the scanning optical system of claim 1.

17. An imaging optical system for focusing, in a scanning optical system for deflecting a light flux from a light source and scanning a target scanning surface, the light flux on the target scanning surface,
    wherein the imaging optical system has at least one optical function surface on which an optical function portion including a plurality of convex portions arranged therein so as to have a serrate cross section is formed in at least part thereof and said at least one optical function surface is formed so that a width of each of the convex portions in an arrangement direction in which the convex portions are arranged is substantially equal to or larger than a width of the light flux in the arrangement direction, which enters the optical function surface.

* * * * *